US010721035B2

(12) United States Patent
Gloeckner et al.

(10) Patent No.: US 10,721,035 B2
(45) Date of Patent: *Jul. 21, 2020

(54) METHOD AND SYSTEM FOR AN OPTOELECTRONIC BUILT-IN SELF-TEST SYSTEM FOR SILICON PHOTONICS OPTICAL TRANSCEIVERS (71) Applicant: Luxtera LLC., Wilmington, DE (US)

(72) Inventors: Steffen Gloeckner, San Diego, CA (US); Subal Sahni, La Jolla, CA (US); Joseph Balardeta, Encinitas, CA (US); Simon Pang, Carlsbad, CA (US); Stefan Barabas, West Melbourne, FL (US); Scott Denton, Carlsbad, CA (US)

(73) Assignee: Luxtera LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,512

(22) Filed: Jul. 3, 2019

(65) Prior Publication Data
US 2019/0327036 A1    Oct. 24, 2019

Related U.S. Application Data (63) Continuation of application No. 15/962,829, filed on Apr. 25, 2018, now Pat. No. 10,348,459, which is a
(Continued)

(51) Int. Cl.
*H04B 17/00* (2015.01)
*H04L 1/24* (2006.01)
(Continued)

(52) U.S. Cl.
CPC ........ *H04L 1/243* (2013.01); *H04B 10/0779* (2013.01); *H04B 10/40* (2013.01); *H04B 10/801* (2013.01); *H04L 1/244* (2013.01)

(58) Field of Classification Search
CPC ..... H04L 1/243; H04L 1/244; H04B 10/0779; H04B 10/801; H04B 10/40
(Continued)

(56) References Cited

U.S. PATENT DOCUMENTS

7,099,424 B1 * 8/2006 Chang ................. H03L 7/07
375/370
7,313,198 B2   12/2007 Rahman
(Continued)

*Primary Examiner* — Don N Vo
(74) *Attorney, Agent, or Firm* — Patterson + Sheridan, LLP (57) ABSTRACT

Methods and systems for an optoelectronic built-in self-test (BIST) system for silicon photonics optical transceivers may include an optoelectronic transceiver having a transmit (Tx) path and a receive (Rx) path, where the Rx path includes a main Rx path and a BIST loopback path. The system may generate a pseudo-random bit sequence (PRBS) signal, generate an optical signal in the Tx path by applying the PRBS signal to a modulator, communicate the optical signal to the BIST loopback path and convert the optical signal to an electrical signal utilizing a photodetector, where the photodetector is a replica of a photodetector in the main Rx path, and assess the performance of the Tx and Rx paths by extracting a PRBS signal from the electrical signal. The transceiver may be on a single complementary-metal oxide semiconductor (CMOS) die, or on two CMOS die where a first comprises electronic devices and a second comprises optical devices.

23 Claims, 7 Drawing Sheets

Related U.S. Application Data continuation of application No. 14/752,729, filed on Jun. 26, 2015, now Pat. No. 9,960,888.

(60) Provisional application No. 61/998,396, filed on Jun. 26, 2014.

(51) Int. Cl.
*H04B 10/40* (2013.01)
*H04B 10/077* (2013.01)
*H04B 10/80* (2013.01)

(58) Field of Classification Search
USPC .......................................................... 398/16
See application file for complete search history.

(56) References Cited

U.S. PATENT DOCUMENTS

| | | | |
|---|---|---|---|
| 9,118,411 B1 | 8/2015 | Schmidt | |
| 9,960,888 B2 | 5/2018 | Gloeckner | |
| 10,348,459 B2* | 7/2019 | Gloeckner | ......... H04B 10/0779 |
| 2003/0043752 A1 | 3/2003 | Totsuka | |
| 2004/0030968 A1 | 2/2004 | Fan | |
| 2007/0121711 A1 | 5/2007 | Offord | |
| 2011/0279109 A1 | 11/2011 | Masuda | |
| 2012/0063773 A1 | 3/2012 | Sluz | |
| 2013/0039654 A1* | 2/2013 | Park | ...................... H04B 10/40 |
| | | | 398/41 |
| 2014/0092394 A1* | 4/2014 | Detofsky | ........... H04B 10/0731 |
| | | | 356/501 |
| 2014/0212131 A1* | 7/2014 | Zhang | ................ H04B 10/0771 |
| | | | 398/16 |
| 2014/0254372 A1 | 9/2014 | Fisher | |

\* cited by examiner

METHOD AND SYSTEM FOR AN OPTOELECTRONIC BUILT-IN SELF-TEST SYSTEM FOR SILICON PHOTONICS OPTICAL TRANSCEIVERS

CROSS-REFERENCE TO RELATED APPLICATIONS/INCORPORATION BY REFERENCE

This application is a continuation of U.S. application Ser. No. 15/962,829 filed on Apr. 25, 2018, now U.S. Pat. No. 10,348,459, which is a continuation of U.S. application Ser. No. 14/752,729 filed on Jun. 26, 2015, now U.S. Pat. No. 9,960,888, which claims priority to and the benefit of U.S. Provisional Application 61/998,396 filed on Jun. 26, 2014, each of which is hereby incorporated herein by reference in its entirety.

FIELD

Certain embodiments of the disclosure relate to semiconductor photonics. More specifically, certain embodiments of the disclosure relate to a method and system for an optoelectronic built-in self-test system for silicon photonics optical transceivers.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for an optoelectronic built-in self-test system for silicon photonics optical transceivers, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for an optoelectronic built-in self-test system for silicon photonics optical transceivers. Exemplary aspects of the disclosure may comprise, in an optoelectronic transceiver having a transmit (Tx) path and a receive (Rx) path, where the Rx path comprises a main Rx path and a built-in self-test loopback path: generating a pseudo-random bit sequence (PRBS) signal, generating an optical signal in the Tx path by applying the PRBS signal to an optical modulator, communicating the optical signal to the built-in self-test loopback path, converting the optical signal to an electrical signal in the Rx path utilizing a loopback photodetector in the built-in self-test loopback path, where the loopback photodetector is a replica of a photodetector in the main Rx path, and assessing the performance of the Tx and Rx paths by extracting a PRBS signal from the electrical signal. The optoelectronic transceiver may be in a silicon photonically-enabled integrated circuit. The silicon photonically-enabled integrated circuit may be in a single complementary-metal oxide semiconductor (CMOS) die or may be in two CMOS die, where a first die comprises electronic devices and a second die comprises optical devices. The optical modulator may comprise a Mach-Zehnder Interferometer. A transimpedance amplifier in the loopback path may be a replica of a transimpedance amplifier in the main Rx path. The PRBS signal may be multiplexed with an input electrical signal to be transmitted by the Tx path. A second optical signal may be received in the main Rx path. A second electrical signal may be generated from the received second optical signal utilizing the photodetector in the main Rx path. The electrical signal may be multiplexed with the second electrical signal.

Figure 1A:
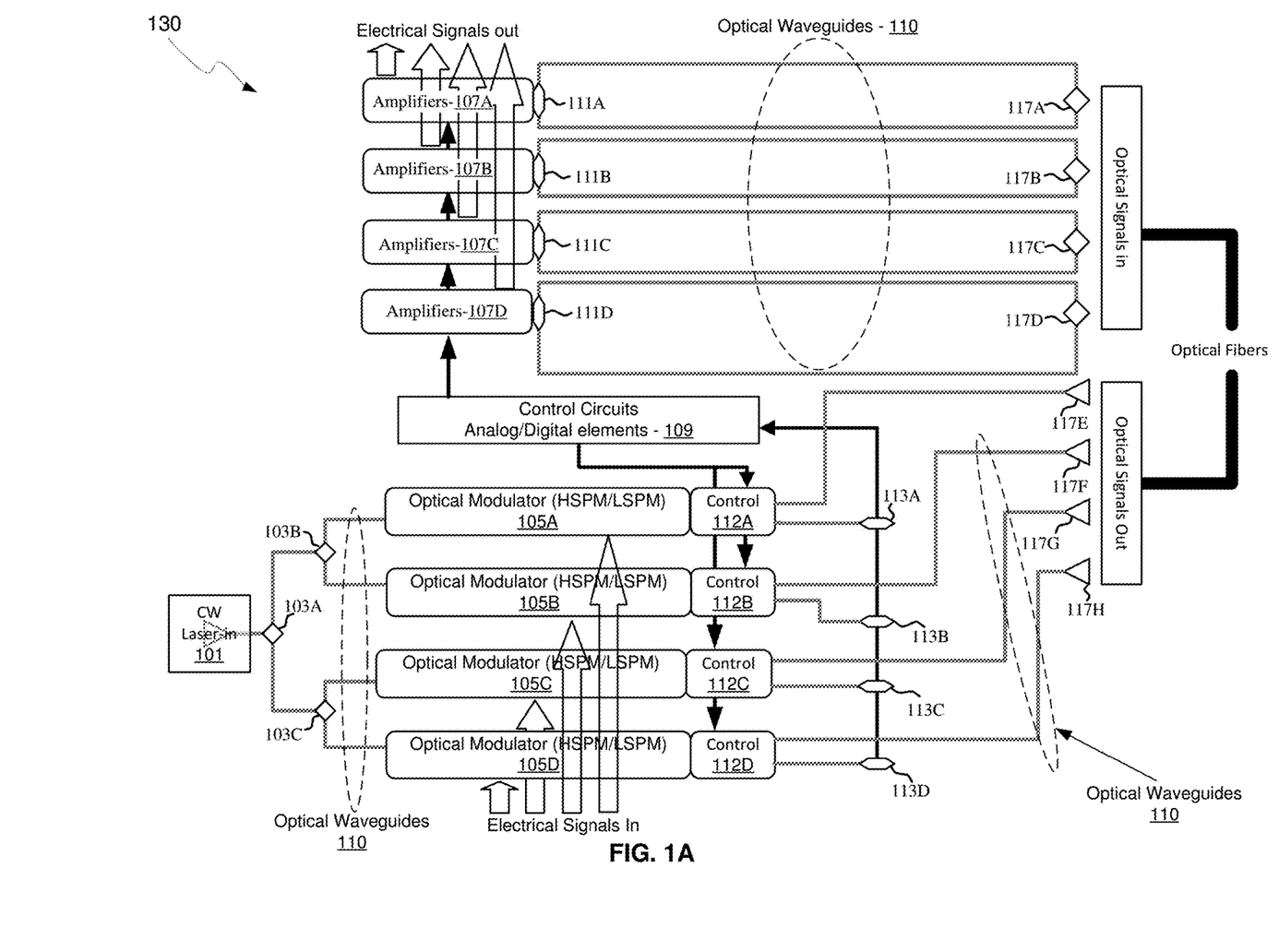
FIG. 1A is a block diagram of a photonically-enabled integrated circuit with optoelectronic built-in self-test system, in accordance with an example embodiment of the disclosure.

FIG. 1A is a block diagram of a photonically-enabled integrated circuit with optoelectronic built-in self-test system, in accordance with an example embodiment of the disclosure. Referring to FIG. 1A, there are shown optoelectronic devices on a photonically-enabled integrated circuit 130 comprising optical modulators 105A-105D, photodiodes 111A-111D, monitor photodiodes 113A-113D, and optical devices comprising couplers 103A-103C and grating couplers 117A-117H. There are also shown electrical devices and circuits comprising amplifiers 107A-107D, analog and digital control circuits 109, and control sections 112A-112D. The amplifiers 107A-107D may comprise transimpedance and limiting amplifiers (TIA/LAs), for example.

In an example scenario, the photonically-enabled integrated circuit 130 comprises a CMOS photonics die with a laser assembly 101 coupled to the top surface of the IC 130. The laser assembly 101 may comprise one or more semiconductor lasers with isolators, lenses, and/or rotators for directing one or more continuous-wave (CW) optical signals to the coupler 103A. The photonically enabled integrated circuit 130 may comprise a single chip, or may be integrated on a plurality of die, such as with one or more electronics die and one or more photonics die.

Optical signals are communicated between optical and optoelectronic devices via optical waveguides 110 fabricated in the photonically-enabled integrated circuit 130. Single-mode or multi-mode waveguides may be used in photonic integrated circuits. Single-mode operation enables direct connection to optical signal processing and networking elements. The term "single-mode" may be used for waveguides that support a single mode for each of the two polarizations, transverse-electric (TE) and transverse-magnetic (TM), or for waveguides that are truly single mode and only support one mode. Such one mode may have, for example, a polarization that is TE, which comprises an electric field parallel to the substrate supporting the waveguides. Two typical waveguide cross-sections that are utilized comprise strip waveguides and rib waveguides. Strip waveguides typically comprise a rectangular cross-section, whereas rib waveguides comprise a rib section on top of a waveguide slab. Of course, other waveguide cross section types are also contemplated and within the scope of the disclosure.

In an example scenario, the couplers 103A-103C may comprise low-loss Y-junction power splitters where coupler 103A receives an optical signal from the laser assembly 101 and splits the signal to two branches that direct the optical signals to the couplers 103B and 103C, which split the optical signal once more, resulting in four roughly equal power optical signals.

The optical power splitter, may comprise at least one input waveguide and at least two output waveguides. The couplers 103A-103C shown in FIG. 1A illustrate 1-by-2 splitters, which divide the optical power in one waveguide into two other waveguides evenly. These Y-junction splitters may be used in multiple locations in an optoelectronic system, such as in a Mach-Zehnder interferometer (MZI) modulator, e.g., the optical modulators 105A-105D, where a splitter and a combiner are needed, since a power combiner can be a splitter used in reverse.

The optical modulators 105A-105D comprise Mach-Zehnder or ring modulators, for example, and enable the modulation of the continuous-wave (CW) laser input signal. The optical modulators 105A-105D may comprise high-speed and low-speed phase modulation sections and are controlled by the control sections 112A-112D. The high-speed phase modulation section of the optical modulators 105A-105D may modulate a CW light source signal with a data signal. The low-speed phase modulation section of the optical modulators 105A-105D may compensate for slowly varying phase factors such as those induced by mismatch between the waveguides, waveguide temperature, or waveguide stress and is referred to as the passive phase, or the passive biasing of the MZI.

In an example scenario, the high-speed optical phase modulators may operate based on the free carrier dispersion effect and may demonstrate a high overlap between the free carrier modulation region and the optical mode. High-speed phase modulation of an optical mode propagating in a waveguide is the building block of several types of signal encoding used for high data rate optical communications. Speed in the several Gb/s may be required to sustain the high data rates used in modern optical links and can be achieved in integrated Si photonics by modulating the depletion region of a PN junction placed across the waveguide carrying the optical beam. In order to increase the modulation efficiency and minimize the loss, the overlap between the optical mode and the depletion region of the PN junction must be carefully optimized.

One output of each of the optical modulators 105A-105D may be optically coupled via the waveguides 110 to the grating couplers 117E-117H. The other outputs of the optical modulators 105A-105D may be optically coupled to monitor photodiodes 113A-113D to provide a feedback path. The IC 130 may utilize waveguide based optical modulation and receiving functions. Accordingly, the receiver may employ an integrated waveguide photo-detector (PD), which may be implemented with epitaxial germanium/SiGe films deposited directly on silicon, for example.

The grating couplers 117A-117H may comprise optical gratings that enable coupling of light into and out of the photonically-enabled integrated circuit 130. The grating couplers 117A-117D may be utilized to couple light received from optical fibers into the photonically-enabled integrated circuit 130, and the grating couplers 117E-117H may be utilized to couple light from the photonically-enabled integrated circuit 130 into optical fibers. The grating couplers 117A-117H may comprise single polarization grating couplers (SPGC) and/or polarization splitting grating couplers (PSGC). In instances where a PSGC is utilized, two input, or output, waveguides may be utilized.

The optical fibers may be epoxied, for example, to the CMOS chip, and may be aligned at an angle from normal to the surface of the photonically-enabled integrated circuit 130 to optimize coupling efficiency. In an example embodiment, the optical fibers may comprise single-mode fiber (SMF) and/or polarization-maintaining fiber (PMF).

Figure 1B:
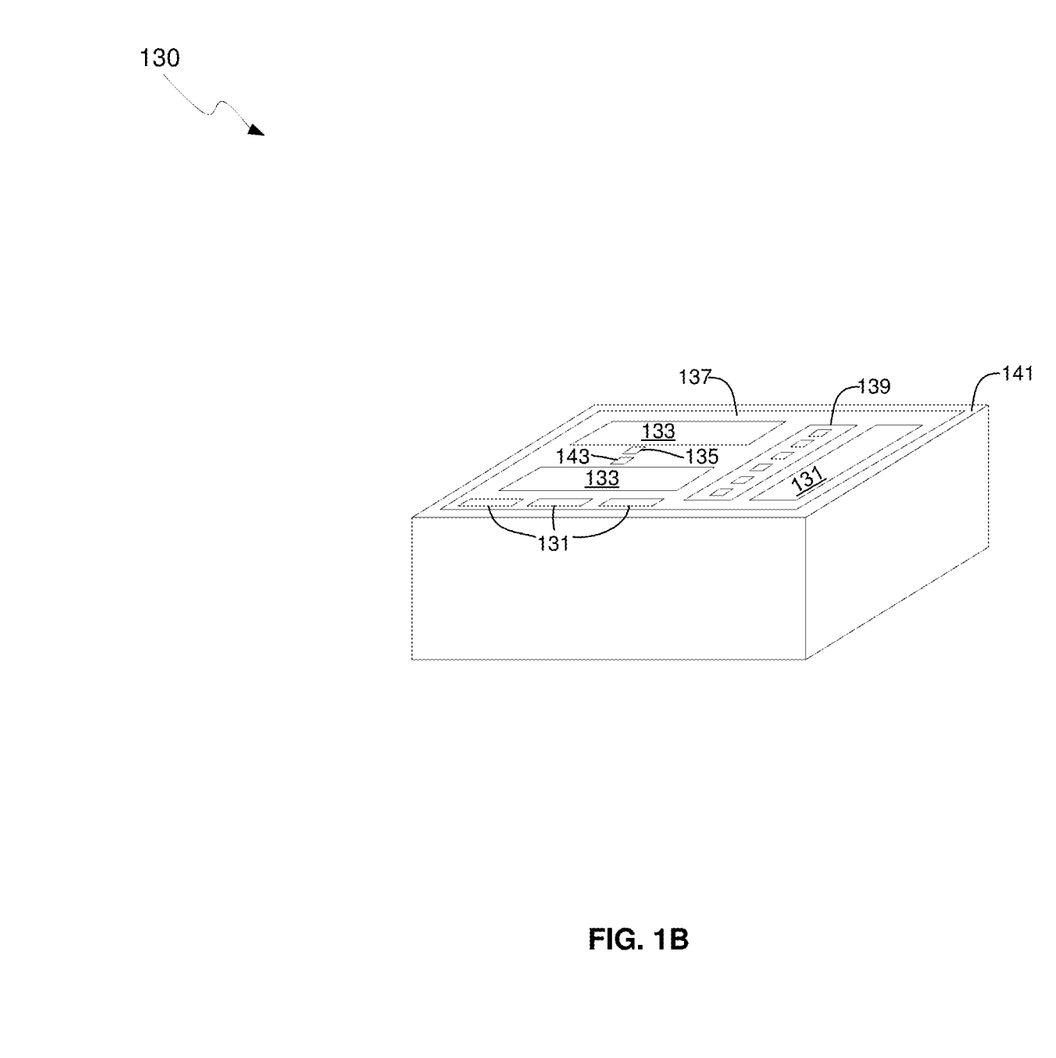
FIG. 1B is a diagram illustrating an exemplary photonically-enabled integrated circuit, in accordance with an example embodiment of the disclosure.

In another exemplary embodiment illustrated in FIG. 1B, optical signals may be communicated directly into the surface of the photonically-enabled integrated circuit 130 without optical fibers by directing a light source on an optical coupling device in the chip, such as the light source interface 135 and/or the optical fiber interface 139. This may be accomplished with directed laser sources and/or optical sources on another chip flip-chip bonded to the photonically-enabled integrated circuit 130.

The photodiodes 111A-111D may convert optical signals received from the grating couplers 117A-117D into electrical signals that are communicated to the amplifiers 107A-107D for processing. In another embodiment of the disclosure, the photodiodes 111A-111D may comprise high-speed heterojunction phototransistors, for example, and may comprise germanium (Ge) in the collector and base regions for absorption in the 1.3-1.6 μm optical wavelength range, and may be integrated on a CMOS silicon-on-insulator (SOI) wafer.

The analog and digital control circuits 109 may control gain levels or other parameters in the operation of the amplifiers 107A-107D, which may then communicate electrical signals off the photonically-enabled integrated circuit 130. The control sections 112A-112D comprise electronic circuitry that enables modulation of the CW laser signal received from the splitters 103A-103C. The optical modulators 105A-105D may require high-speed electrical signals to modulate the refractive index in respective branches of a Mach-Zehnder interferometer (MZI), for example. In an example embodiment, the control sections 112A-112D may include sink and/or source driver electronics that may enable a bidirectional link utilizing a single laser.

In operation, the photonically-enabled integrated circuit 130 may be operable to transmit and/or receive and process optical signals. Optical signals may be received from optical fibers by the grating couplers 117A-117D and converted to electrical signals by the photodetectors 111A-111D. The electrical signals may be amplified by transimpedance amplifiers in the amplifiers 107A-107D, for example, and subsequently communicated to other electronic circuitry, not shown, in the photonically-enabled integrated circuit 130.

Integrated photonics platforms allow the full functionality of an optical transceiver to be integrated on a single chip. An optical transceiver chip contains optoelectronic circuits that create and process the optical/electrical signals on the transmitter (Tx) and the receiver (Rx) sides, as well as optical interfaces that couple the optical signals to and from a fiber. The signal processing functionality may include modulating the optical carrier, detecting the optical signal, splitting or combining data streams, and multiplexing or demultiplexing data on carriers with different wavelengths.

One of the most important commercial applications of silicon photonics is to make high speed optical transceivers, i.e., ICs that have optoelectronic transmission (Tx) and receiving (Rx) functionality integrated in the same chip. The input to such an IC is either a high speed electrical datastream that is encoded onto the Tx outputs of the chip by modulating the light from a laser or an optical data-stream that is received by integrated photo-detectors and converted into a suitable electrical signal by going through a Transimpedance Amplifier (TIA)/Limiting Amplifier (LA) chain. Such silicon photonics transceiver links have been successfully implemented at baud-rates ranging from 10 Gbps to 28 Gbps.

The presence of both Tx and Rx blocks on the same die leads to the possibility of establishing a local Tx-Rx optical link that can be used as a powerful built-in self-test feature to gauge the DC and dynamic performance of the optoelectronic devices and circuit blocks. Such a test can be used during CMOS wafer sort to filter out defective die and to bin chips based on parametric performance. It can also be implemented to perform a similar function in an assembly line that manufactures modules using these transceiver chips or as a tool to debug and perform failure analysis on failed modules. In an example embodiment, this built-in self-test feature is implemented using optical and electronic design features that can enable such a local link without disturbing the main functionality of the die.

FIG. 1B is a diagram illustrating an exemplary photonically-enabled integrated circuit, in accordance with an example embodiment of the disclosure. Referring to FIG. 1B, there is shown the photonically-enabled integrated circuit 130 comprising electronic devices/circuits 131, optical and optoelectronic devices 133, a light source interface 135, a chip front surface 137, an optical fiber interface 139, CMOS guard ring 141, and a surface-illuminated monitor photodiode 143.

The light source interface 135 and the optical fiber interface 139 comprise grating couplers, for example, that enable coupling of light signals via the CMOS chip surface 137, as opposed to the edges of the chip as with conventional edge-emitting/receiving devices. Coupling light signals via the chip surface 137 enables the use of the CMOS guard ring 141 which protects the chip mechanically and prevents the entry of contaminants via the chip edge.

The electronic devices/circuits 131 comprise circuitry such as the amplifiers 107A-107D and the analog and digital control circuits 109 described with respect to FIG. 1A, for example. The optical and optoelectronic devices 133 comprise devices such as the couplers 103A-103C, optical terminations, grating couplers 117A-117H, optical modulators 105A-105D, high-speed heterojunction photodiodes 111A-111D, and monitor photodiodes 113A-113D.

In an example scenario, the monitor photodiodes may comprise feedback paths for the optoelectronic transceivers in the IC 130, thereby enabling a built-in self-test for transceivers.

Figure 1C:
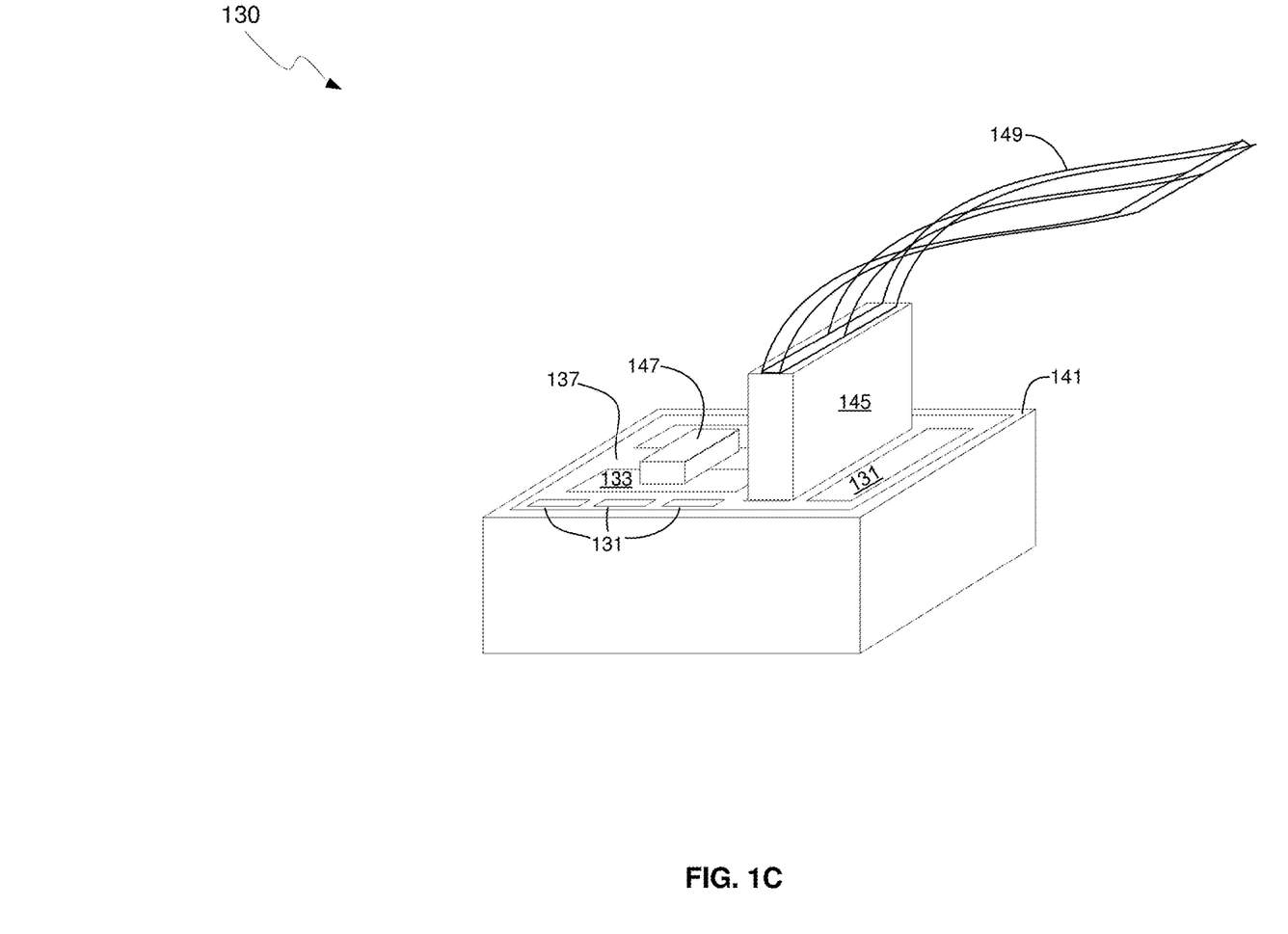
FIG. 1C is a diagram illustrating a photonically-enabled integrated circuit coupled to an optical fiber cable, in accordance with an example embodiment of the disclosure.

FIG. 1C is a diagram illustrating a photonically-enabled integrated circuit coupled to an optical fiber cable, in accordance with an example embodiment of the disclosure. Referring to FIG. 1C, there is shown the photonically-enabled integrated circuit 130 comprising the chip surface 137, and the CMOS guard ring 141. There are also shown a fiber-to-chip coupler 145, an optical fiber cable 149, and an optical source assembly 147.

The photonically-enabled integrated circuit 130 comprises the electronic devices/circuits 131, the optical and optoelectronic devices 133, the light source interface 135, the chip surface 137, and the CMOS guard ring 141 may be as described with respect to FIG. 1B.

In an example embodiment, the optical fiber cable may be affixed, via epoxy for example, to the CMOS chip surface 137. The fiber chip coupler 145 enables the physical coupling of the optical fiber cable 149 to the photonically-enabled integrated circuit 130.

Figure 2A:
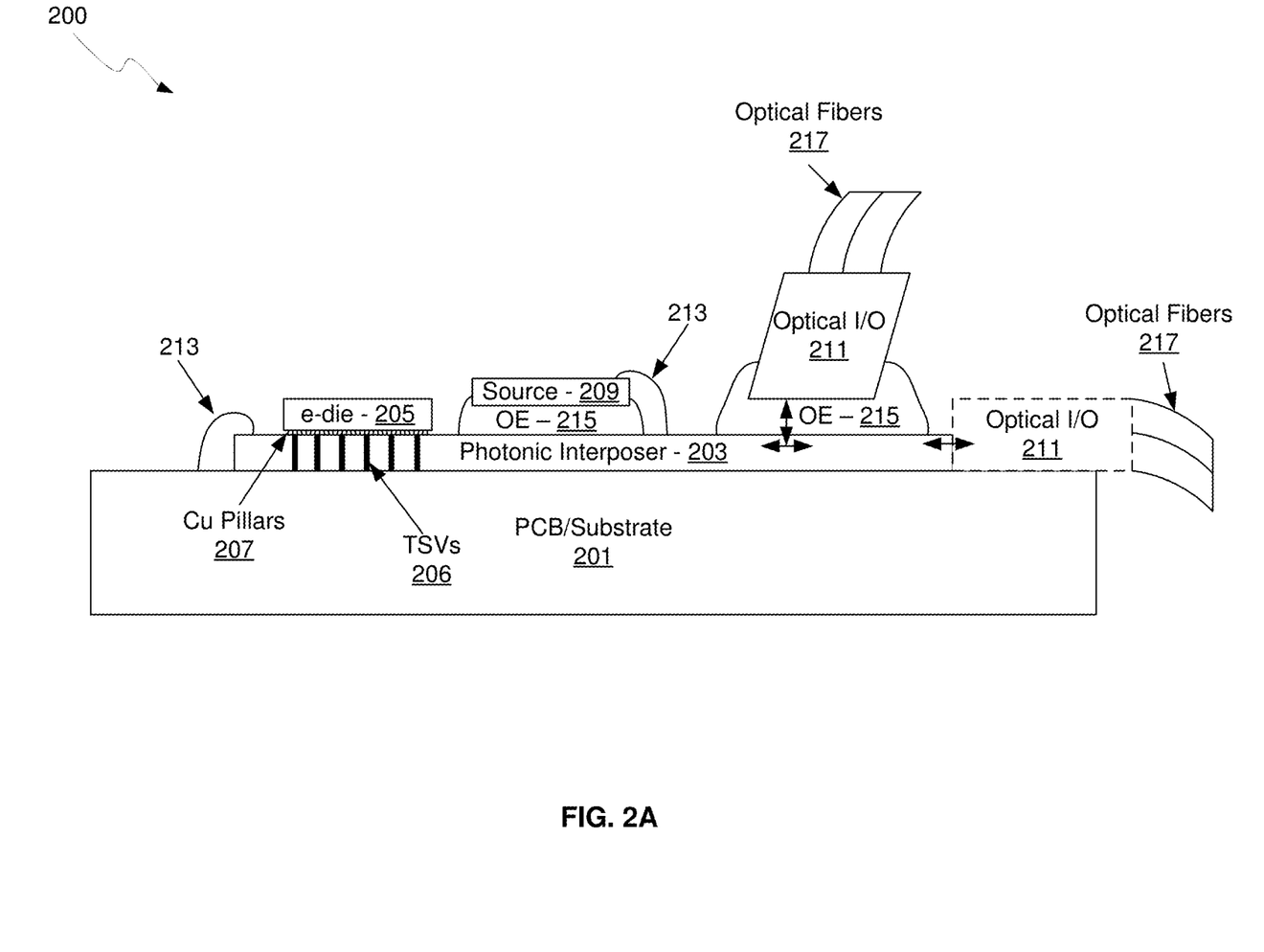
FIG. 2A is a schematic illustrating an exemplary optical transceiver including a photonic interposer, in accordance with an embodiment of the invention.

FIG. 2A is a schematic illustrating an exemplary optical transceiver including a photonic interposer, in accordance with an embodiment of the invention. Referring to FIG. 2A, there is shown a photonic transceiver 200 comprising a printed circuit board (PCB)/substrate 201, a silicon photonic interposer 203, an electronic CMOS die 205, through silicon vias (TSVs) 206, copper pillars 207, an optical source module 209, an optical input/output (I/O) 211, wire bonds 213, optical epoxy 215, and optical fibers 217.

The PCB/substrate 201 may comprise a support structure for the photonic transceiver 200, and may comprise both insulating and conductive material for isolating devices as well as providing electrical contact for active devices on the silicon photonic interposer 203 as well as to devices on the electronics die 205 via the silicon photonic interposer 203. In addition, the PCB/substrate may provide a thermally conductive path to carry away heat generated by devices and circuits in the electronics die 205 and the optical source module 209.

The silicon photonic interposer 203 may comprise a CMOS chip with active and passive optical devices such as waveguides, modulators, photodetectors, grating couplers, taps, and combiners, for example. The functionalities supported by the silicon photonic interposer 203 may comprise photo-detection, optical modulation, optical routing, and optical interfaces for high-speed I/O and optical power delivery.

The silicon photonic interposer 203 may also comprise copper pillars 207 for coupling the electronics die 205 to the silicon photonic interposer 203, as well as grating couplers for coupling light into the die from the optical source module 209 and into/out of the die via the optical I/O 211. In addition, the silicon photonic interposer 203 may comprise TSVs 206 for electrical interconnection through the die, such as between the PCB/substrate 201 and the electronics die 205. Optical interfaces may also be facilitated by the optical epoxy 215, providing both optical transparency and mechanical fixation.

The electronics die 205 may comprise one or more electronic CMOS chips that provide the required electronic functions of the photonic transceiver 200. The electronics die 205 may comprise a single chip or a plurality of die coupled to the silicon photonic interposer 203 via the copper pillars 207. The electronics die 205 may comprise TIA's, LNAs, and control circuits for processing optical signals in the photonics chip 203. For example, the electronics die 205 may comprise driver circuitry for controlling optical modulators in the silicon photonic interposer 203 and variable gain amplifiers for amplifying electrical signals received from photodetectors in the silicon photonic interposer 203. By incorporating photonics devices in the silicon photonic interposer 203 and electronic devices in the electronics die 205, the CMOS processes for each chip may be optimized for the type of devices incorporated.

The TSVs 206 may comprise electrically conductive paths that extend vertically through the silicon photonic interposer 203 and provide electrical connectivity between the electronics die 205 and the PCB/substrate 201. This may be utilized in place of wire bonds, such as the wire bonds 213, or in conjunction with wire bonds.

The copper pillars 207 may comprise linear or 2D arrays of metal pillars to provide electrical contact between the silicon photonic interposer 203 and the electronics die 205. For example, the copper pillars 207 may provide electrical contact between photodetectors in the silicon photonic interposer 203 and associated receiver circuitry in the electronics die 205. In addition, the copper pillars 207 may provide mechanical coupling of the electronics and photonics die, and may be encapsulated with underfill to protect the metal and other surfaces.

The optical source module 209 may comprise an assembly with an optical source, such as a semiconductor laser, and associated optical and electrical elements to direct one or more optical signals into the silicon photonic interposer 203. An example of the optical source module is described in U.S. patent application Ser. No. 12/500,465 filed on Jul. 9, 2009, which is hereby incorporated herein by reference in its entirety. In another exemplary scenario, the optical signal or signals from the optical source assembly 209 may be coupled into the silicon photonic interposer 203 via optical fibers affixed above grating couplers in the silicon photonic interposer 203.

The optical I/O 211 may comprise an assembly for coupling the optical fibers 217 to the silicon photonic interposer 203. Accordingly, the optical I/O 211 may comprise mechanical support for one or more optical fibers and an optical surface to be coupled to the silicon photonic interposer 203, such as by the optical epoxy 215. In another exemplary scenario, the optical I/O 211 may also be affixed along an edge of the silicon photonic interposer 203, as shown by the dashed line optical I/O 211, enabling the coupling of optical signals directly into optical waveguides as opposed to grating couplers on the surface of the silicon photonic interposer 203.

In operation, continuous-wave (CW) optical signals may be communicated into the silicon photonic interposer 203 from the optical source module 209 via one or more grating couplers in the silicon photonic interposer 203. Photonic devices in the silicon photonic interposer 203 may then process the received optical signal. For example, one or more optical modulators may modulate the CW signal based on electrical signals received from the electronics die 205. Electrical signals may be received from the electronics die 205 via the Cu pillars 207. By integrating modulators in the silicon photonic interposer 203 directly beneath the source of the electrical signals in the electronics die 205, signal path lengths may be minimized, resulting in very high speed performance. For example, utilizing ~20 micron Cu pillars with <20 fF capacitance, speeds of 50 GHz and higher can be achieved.

The modulated optical signals may then be communicated out of the silicon photonic interposer 203 via grating couplers situated beneath the optical I/O 211. In this manner, high-speed electrical signals generated in the electronics die 205 may be utilized to modulate a CW optical signal and subsequently communicated out of the silicon photonic interposer 203 via the optical fibers 217.

Similarly, modulated optical signals may be received in the silicon photonic interposer 203 via the optical fibers 217 and the optical I/O 211. The received optical signals may be communicated within the silicon photonic interposer 203 via optical waveguides to one or more photodetectors integrated in the silicon photonic interposer 203. The photodetectors may be integrated in the silicon photonic interposer 203 such that they lie directly beneath the associated receiver electronics circuitry in the electronics die 205 when bonded and electrically coupled by the low parasitic capacitance Cu pillars 207.

The hybrid integration of CMOS electronics die on a silicon photonic interposer via Cu pillars enables very high speed optical transceivers utilizing CMOS processes. In addition, integrating separate photonic and electronic die enables the independent optimization of the performance of electronic and photonic functions within the respective CMOS processes. The electronic die, which is mounted by face-to-face bonding to the silicon photonic interposer, may contain electrical circuits that "drive" the photonic circuits on the interposer. Those circuits replace the electronic signaling drive circuits from conventional electrical interconnect solutions.

In addition, optical interconnect between multiple electronic die, i.e. chip-to-chip interconnect, is enabled by the silicon photonic interposer 203, where transceiver functions are supported by the combined electronic die and interposer and the associated optical routing on the silicon photonic interposer die 203. The disclosure is not limited to the arrangement shown in FIG. 2A. Accordingly, various stacking arrangements are possible. For example, photonic interposers may be sandwiched between electronic chips and stacks of interposers/electronic chips may be configured resulting in a 3-dimensional structure.

The presence of both Tx and Rx blocks on the same die stack leads to the possibility of establishing a local Tx-Rx optical link that can be used as a powerful built-in self-test feature to gauge the DC and dynamic performance of the optoelectronic devices and circuit blocks. Such a test can be used during CMOS wafer sort to filter out defective die and to bin chips based on parametric performance. It can also be implemented to perform a similar function in an assembly line that manufactures modules using these transceiver chips or as a tool to debug and perform failure analysis on failed modules. Again, in an example embodiment, this built-in self-test feature is implemented using optical and electronic design features that can enable such a local link without disturbing the main functionality of the die.

Figure 2B:
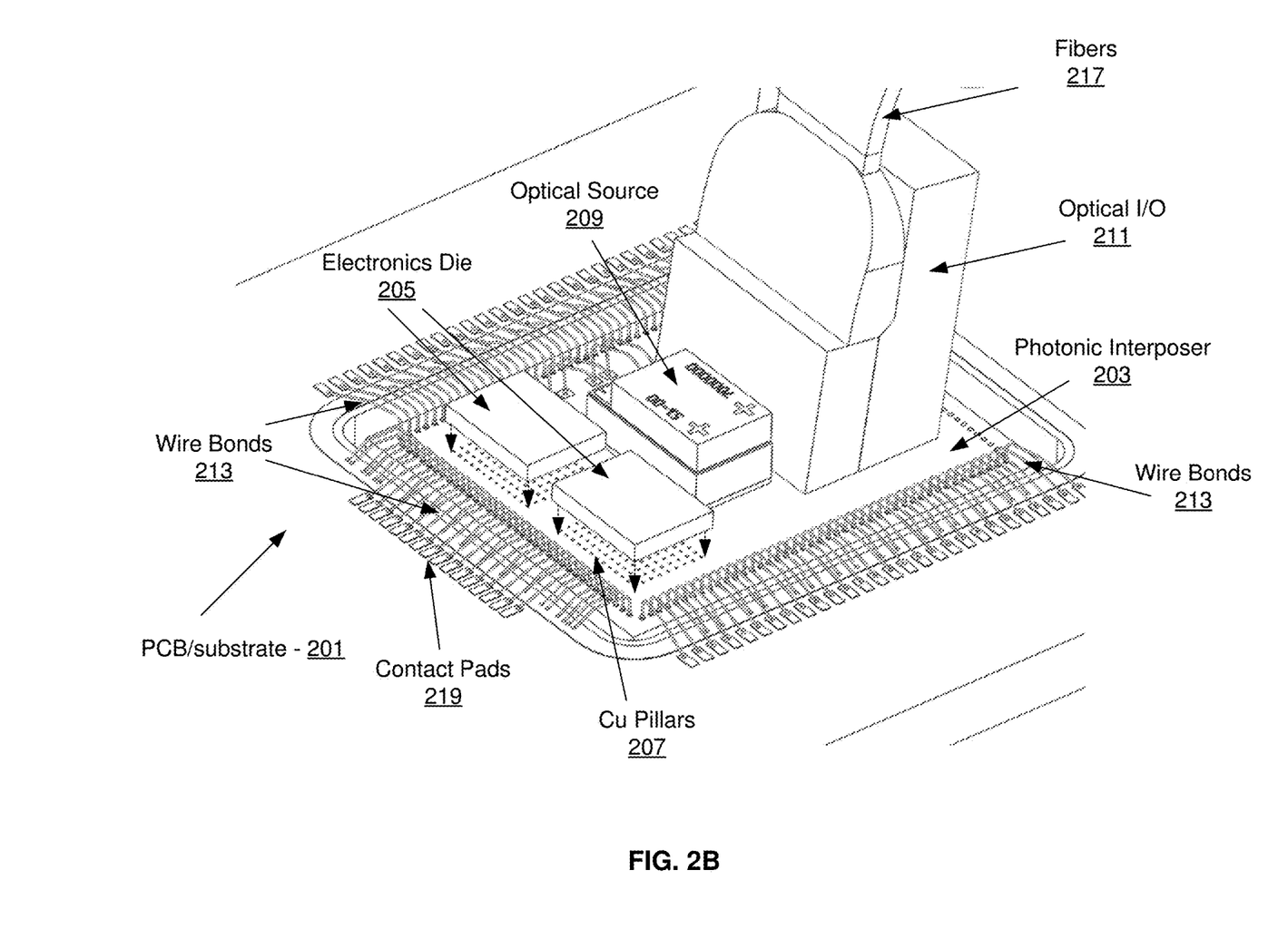
FIG. 2B is a perspective view of a hybrid integration photonic transceiver, in accordance with an embodiment of the invention.

FIG. 2B is a perspective view of a hybrid integration photonic transceiver, in accordance with an embodiment of the invention. Referring to FIG. 2B, there is shown the PCB/substrate 201, the silicon photonic interposer 203, electronics die 205, the Cu pillars 207, the optical source assembly 209, the optical I/o 211, wire bonds 213, optical fibers 217, and contact pads 219.

The electronics die 205 are shown prior to bonding to the surface of the silicon photonic interposer 203 via the Cu pillars 207, as illustrated by the dashed arrows below each die. While two electronics die 205 are shown in FIG. 2B, it should be noted that the disclosure is not so limited. Accordingly, any number of electronics die may be coupled to the silicon photonic interposer 203 depending on the number of transceivers, the particular CMOS node utilized, thermal conductance, and space limitations, for example.

In another exemplary embodiment, the optical source assembly 209 may be located remotely and one or more optical fibers may be utilized to couple the optical source signal into the silicon photonic interposer 203 via grating couplers, for example.

In an exemplary embodiment, electronic functions may be integrated into the electronics die 205 and photonics circuitry may be integrated into the silicon photonic interposer 203 utilizing independent CMOS processes. The electronics die 205 may comprise electronic devices associated with photonic devices in the silicon photonic interposer 203, thereby minimizing electrical path lengths while still allowing independent performance optimization of electronic and photonic devices. For example, the CMOS processes that result in the highest electronics performance, such as the fastest switching speed, may not be optimum for CMOS photonics performance. Similarly, different technologies may be incorporated in the different die. For example, SiGe CMOS processes may be used for photonic devices such as photodetectors, and 32 nm CMOS processes may be used for electronic devices on the electronics die 205.

The silicon photonic interposer 203 may comprise photonic circuits, whereby optical signals may be received, processed, and transmitted out of the silicon photonic interposer 203. The optical source assembly 209 may provide a CW optical signal to the silicon photonic interposer 203, with the photonics circuitry in the silicon photonic interposer 203 processing the CW signal. For example, the CW signal may be coupled into the silicon photonic interposer 203 via grating couplers, communicated to various locations on the die via optical waveguides, modulated by Mach-Zehnder interferometer (MZI) modulators, and communicated out of the silicon photonic interposer 203 into optical fibers. In this manner, the hybrid integration of a plurality of high performance optical transceivers is enabled in CMOS processes.

In another exemplary scenario, the silicon photonic interposer 203 may provide optical routing between electronics die. For example, the electronics die 205 may comprise a plurality of processors and memory die. Electrical signals from the electronics die 205 may be communicated to modulators on the silicon photonic interposer 203 via copper pillars, for example, and converted to optical signals for routing to another electronics die via optical waveguides before being converted back to electronic signals utilizing photodetectors. In this manner, very high-speed coupling is enabled for a plurality of electronics die, reducing the memory requirements on processor chips, for example.

The utilization of optical signals for interconnecting electronics die enables very dense and low power interconnects, since no controlled impedance lines are necessary. Furthermore, costs may be reduced with integration on a photonics-only die since there is thus no power dissipation die in the interposer, and the electronics die may be heat sinked with conventional methods.

A built-in self-test system may be incorporated by utilizing one output of the optical modulators, or tapping one of the outputs, and feeding the optical signals to a photodiode that is a mirror of the Rx photodiodes. The resulting electrical signals may be coupled to electronics control circuitry in the electronics die 205 for assessing the performance of the Tx side of the assembly.

Figure 3:
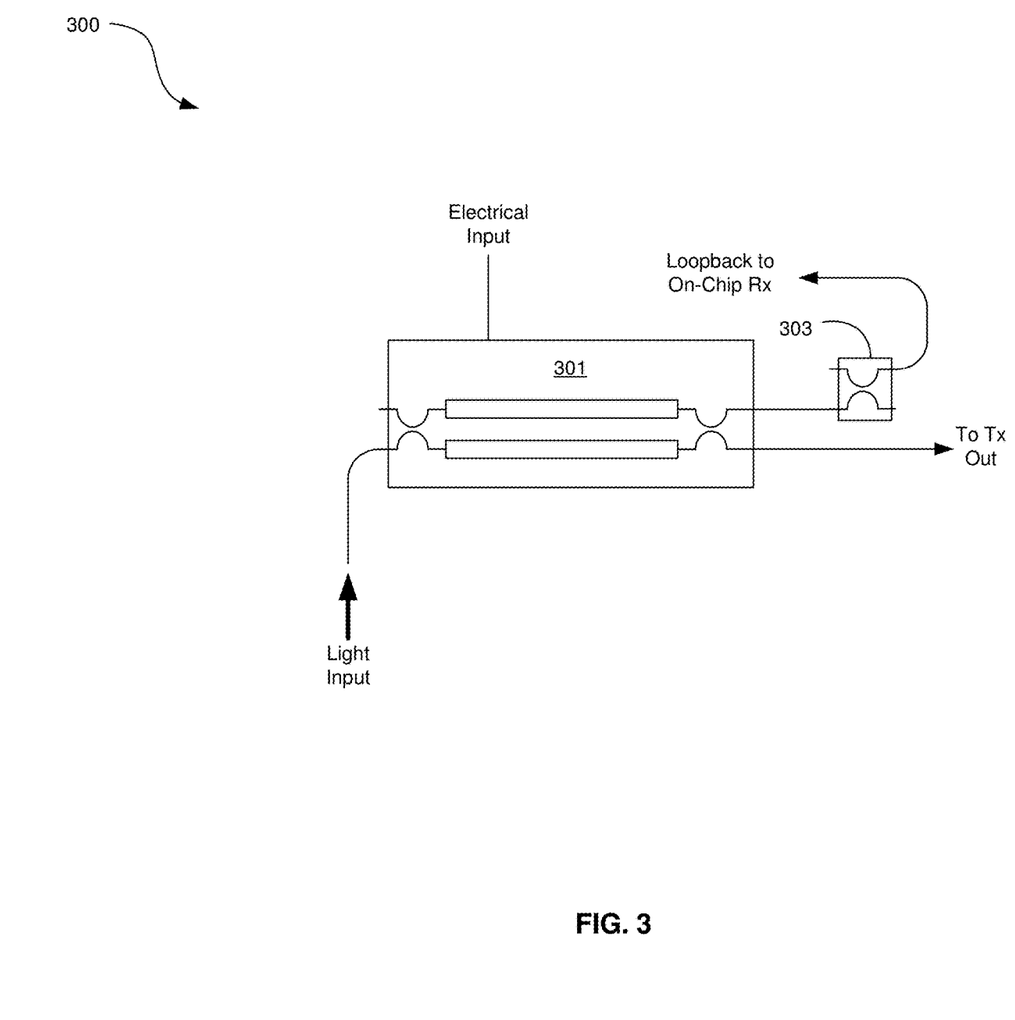
FIG. 3 illustrates an optical modulator with tapped output for a built-in self-test system, in accordance with an example embodiment of the disclosure.

FIG. 3 illustrates an optical modulator with tapped output for a built-in self-test system, in accordance with an example embodiment of the disclosure. Referring to FIG. 3, there is shown a modulator 301 and a tap 303. The modulator 301 may comprise a Mach-Zehnder Interferometer, for example, and may be operable to receive a light input and modulate the intensity to generate a modulated output based on a received electrical input signal.

The tap 303 may comprise waveguides that come in close proximity at a point and optical modes may be tapped from one waveguide to the other. In this manner, a configurable amount of the input optical signal may be coupled to a second path. To enable the built-in self-test system mentioned above, a portion of the spare optical output of the MZI is tapped off and fed back to the photodetector in an on-chip receiver. The magnitude of the tap can be set according to the link-budget requirements of the loop-back path. Note that since the tap is on the spare Tx output, the local optical link can be created without any link-budget penalty in the main data path.

Since the architecture of an MZI inherently results in the two outputs having the same high speed data encoded on them (with one simply being the complement of the other), when light is incident on the chip and electrical modulation is applied to the Tx driver, the data-stream in the optical loopback is identical to the one in the main data path and is a very effective indicator of the dynamic performance of the transmitter.

Figure 4:
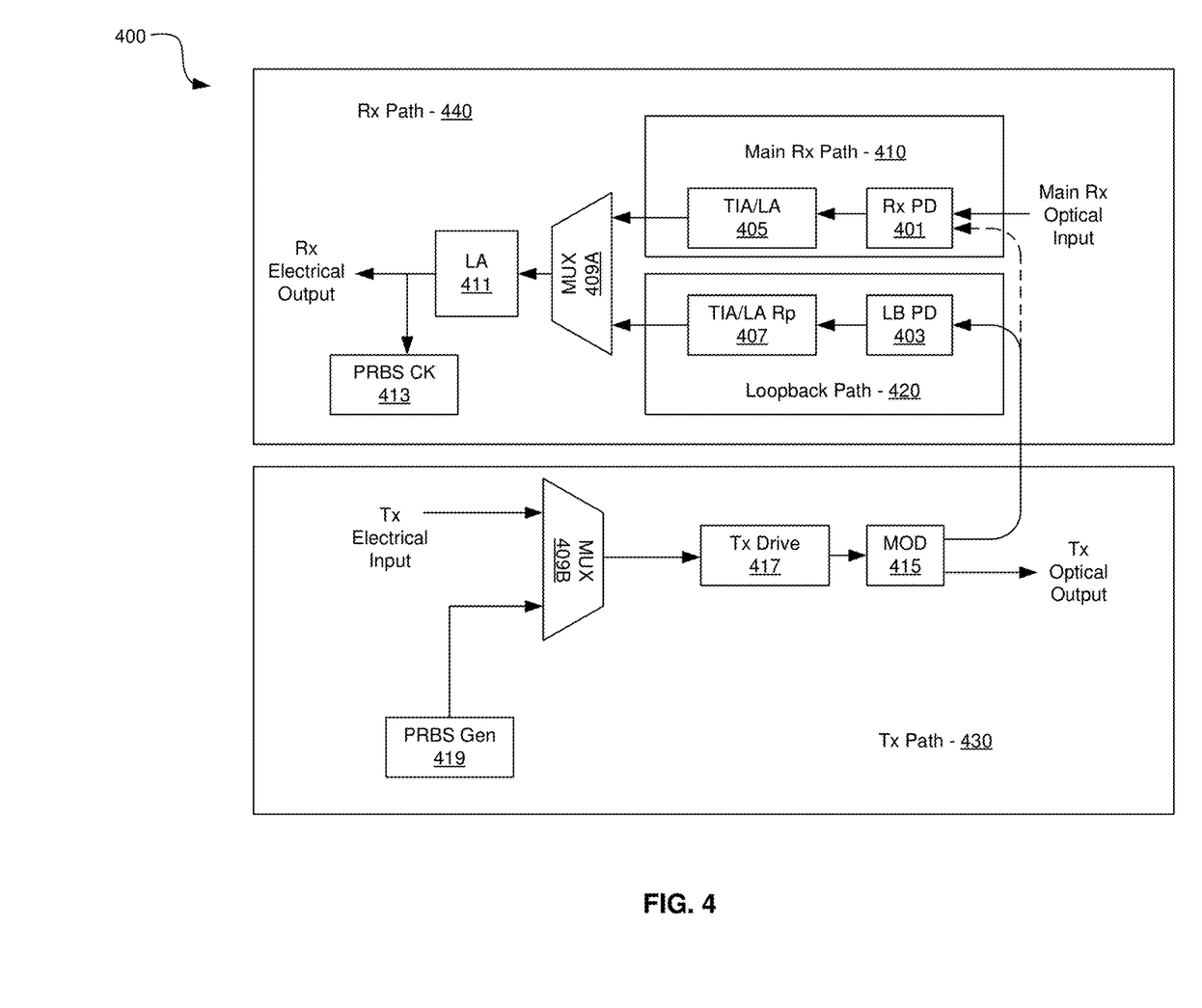
FIG. 4 illustrates a block diagram of electrical and optical blocks in an on-chip built-in self-test system, in accordance with an example embodiment of the disclosure.

FIG. 4 illustrates a block diagram of electrical and optical blocks in an on-chip built-in self-test system, in accordance with an example embodiment of the disclosure. Referring to FIG. 4, there is shown a built-in self-test system 400 comprising a Rx photodetector 401, a loopback photodetector 403, transimpedance amplifier (TIA)/limiting amplifier (LA) initial stages 405, a replica TIA/LA initial stage 407, multiplexers 409A and 409B, LA final stages 411, pseudo-random binary sequence (PRBS) check module 413, a modulator 415, a Tx drive chain 417, and a PRBS generator 419.

The loopback photodetector 403 may be a replica of the main Rx photodetector 401. The output of the loopback photodetector 403 may be amplified by a replica of the TIA/LA 405, the replica TIA/LA 407, and, optionally, a replica of the initial portion of the LA chain. The output of the loopback path 410 may then be muxed into the main data path at a later stage in the MUX 409A. The modulator 415 may comprise an MZI, for example, that is operable to modulate a received CW optical signal to generate a modulated optical output. Other modulators may be utilized other than an interferometric MZI, such as electro-optic and electroabsorption modulators, external modulators, and micro-ring modulators.

The replication of the first part of the amplification chain ensures that the actual data path is not penalized by the loading caused by connecting the loopback circuit elements, while at the same time, muxing the loopback path into the main path after the most sensitive nodes of the chain enables the built-in self-test system 400 to still exercise the remainder of the Rx, such as the LA final stages 411 and other output drivers, for example. The exact location of the MUX 409A can therefore be picked based on an analysis of the sensitivity to loading and noise injection of each stage of the Rx. Accordingly, the performance characteristics of the replica loopback detector 403 and TIA/LA 407 blocks correlate very well to those of the main receiver data-path 410, thereby making the loopback path 420 a good indicator of actual Rx performance.

The built-in self-test system 400 may incorporate PRBS generation 419 and PRBS checking blocks 413 into the Tx and Rx respectively, with the PRBS generator 419 coupled via the MUX 409B. PRBS patterns may be generated and communicated through the Tx path 430 and communicated back to the PRBS check module 413 via the loopback path 420. The PRBS check module compares the extracted PRBS sequence to assess the performance, e.g., bit error rate (BER), of the Tx and Rx paths. This enables complete high speed optoelectronic testing of the Tx-Rx link executed fully on chip, with the only electrical stimulus being a reference clock at a frequency much lower than the baud rate.

The presence of on-chip full data-rate streams allows for detailed measurements of the dynamic performance of the link without the need for expensive broadband test equipment. For instance, with the PRBS generator 419 running, the input optical power into the Tx can be lowered in a controlled manner while monitoring the error checker in order to estimate the stressed sensitivity of the main RF path 410 and the overall link margin.

The above built-in self-test design can be applied to a transceiver chip with multiple Tx and Rx channels since the output from each transmitter can be looped back to a corresponding receiver. Also, light may be injected into the chip from a laser source directly attached to the silicon photonics die or from an external laser coupled into the chip through a fiber. In either case, a wafer scale implementation of the test enables its usage during CMOS wafer-sort. Finally, the method is equally applicable to both a fully monolithic CMOS photonics chip, as shown in FIGS. 1A-1C, comprising optical and electronic elements on the same piece of silicon, or to a hybrid integrated chip-stack, as illustrated in FIGS. 2A-2B, where the optical and electrical functions are separated into two or more die.

In another example scenario, the optical signal from the Tx path 430 may be fed back in to the main Rx path directly, either through an optical Mux or an optical coupler. In this way, the performance of the Tx path 430 and the Main Rx path may be directly measured.

In an example embodiment, a method and system are disclosed for an optoelectronic built-in self-test system for silicon photonics optical transceivers. In this regard, aspects of the disclosure may comprise an optoelectronic transceiver having a transmit (Tx) path and a receive (Rx) path, where the Rx path comprises a main Rx path and a built-in self-test loopback path, and where the optoelectronic transceiver is operable to: generate a pseudo-random bit sequence (PRBS) signal, generate an optical signal in the Tx path by applying the PRBS signal to an optical modulator, communicate the optical signal to the built-in self-test loopback path, convert the optical signal to an electrical signal in the Rx path utilizing a loopback photodetector in the built-in self-test loopback path, where the loopback photodetector is a replica of a photodetector in the main Rx path, and assess the performance of the Tx and Rx paths by extracting a PRBS signal from the electrical signal.

The optoelectronic transceiver may be in a silicon photonically-enabled integrated circuit. The silicon photonically-enabled integrated circuit may be in a single complementary-metal oxide semiconductor (CMOS) die. The silicon photonically-enabled integrated circuit may be in two CMOS die, a first die comprising electronic devices and a second die comprising optical devices. The optical modulator may comprise a Mach-Zehnder Interferometer. A transimpedance amplifier in the loopback path is a replica of a transimpedance amplifier in the main Rx path. The optoelectronic transceiver may be operable to multiplex the PRBS signal with an input electrical signal to be transmitted by the Tx path. The optoelectronic transceiver may be operable to receive a second optical signal in the main Rx path. The optoelectronic transceiver may be operable to generate a second electrical signal from the received second optical signal utilizing the photodetector in the main Rx path and multiplex the electrical with the second electrical signal.

In another example embodiment, aspects of the disclosure may comprise in an optoelectronic transceiver having a transmit (Tx) path and a receive (Rx) path, where the Rx path comprises a main Rx path and a built-in self-test loopback path: generating a first electrical signal in the Tx path, generating a pseudo-random bit sequence (PRBS) signal, multiplexing the first electrical signal with the PRBS signal, generating a first optical signal in the Tx path by applying the multiplexed electrical and PRBS signals to an optical modulator, receiving a second optical signal in the Rx path and converting to a second electrical signal utilizing a photodetector in the main Rx path, communicating the first optical signal to the built-in self-test loopback path, converting the received first optical signal to a third electrical signal in the Rx path utilizing a photodetector in the built-in self-test loopback path, where the photodetector is a replica of a photodetector in the main Rx path, multiplexing the first and third electrical signals in the Rx path, and assessing the performance of the Tx and Rx paths by extracting a PRBS signal from the multiplexed first and third electrical signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

While the disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for optical communication, the method comprising:
in an optoelectronic transceiver having a transmit (Tx) path and a receive (Rx) path, the Rx path comprising a main Rx path and a built-in self-test loopback path:
multiplexing a pseudo-random bit sequence (PRBS) signal with an input electrical signal;
generating an optical signal in the Tx path by applying the multiplexed input electrical signal and PRBS signal to an optical modulator;
communicating the optical signal to a portion of the built-in self-test loopback path;
converting the optical signal to an electrical signal in the Rx path utilizing a loopback photodetector in the built-in self-test loopback path, the loopback photodetector being a replica of a photodetector in the main Rx path;
multiplexing the electrical signal in the Rx path with another electrical signal from the main Rx path; and
assessing performance of the Tx and Rx paths by reducing an input power of the optical signal in the Tx path while monitoring a bit error rate.

2. The method according to claim 1, wherein the transceiver is, at least in part, on an optoelectronics die that comprises a silicon photonic interposer.

3. The method according to claim 1, wherein the transceiver is, at least in part, on one or more electronics die that comprises one or more complementary-metal oxide semiconductor (CMOS) die.

4. The method according to claim 1, wherein the transceiver is on an optoelectronics die and one or more electronics die, and wherein the one or more electronics die is bonded directly to the optoelectronics die.

5. The method according to claim 4, wherein the one or more electronics die is coupled to the optoelectronics die using copper pillars.

6. The method according to claim 1, wherein the optical modulator comprises a Mach-Zehnder Interferometer.

7. The method according to claim 1, wherein a transimpedance amplifier coupled to an output of the loopback photodetector in the self-test loopback path is a replica of a transimpedance amplifier coupled to an output of a photodetector in the main Rx path.

8. The method according to claim 1, comprising extracting the PRBS signal and the input electrical signal from the electrical signal utilizing a demultiplexer in the Rx path.

9. The method according to claim 1, comprising receiving a second optical signal in the main Rx path.

10. The method according to claim 9, comprising generating a second electrical signal from the received second optical signal utilizing the photodetector in the main Rx path.

11. The method according to claim 10, comprising multiplexing the electrical signal in the Rx path with the second electrical signal.

12. A system for communication, the system comprising:
an optoelectronic transceiver having a transmit (Tx) path and a receive (Rx) path, the Rx path comprising a main Rx path and a built-in self-test loopback path, the optoelectronic transceiver being operable to:
multiplex a pseudo-random bit sequence (PRBS) signal with an input electrical signal;
generate an optical signal in the Tx path by applying the multiplexed PRBS signal and input electrical signal to an optical modulator;
communicate the optical signal to the built-in self-test loopback path;
convert the optical signal to an electrical signal in the Rx path utilizing a loopback photodetector in the built-in self-test loopback path, the loopback photodetector being a replica of a photodetector in the main Rx path; and
multiplex the electrical signal in the Rx path with an electrical signal from the photodetector in the main Rx path.

13. The system according to claim 12, wherein the optoelectronic transceiver is in a silicon photonically-enabled integrated circuit.

14. The system according to claim 13, wherein the silicon photonically-enabled integrated circuit is in a single complementary-metal oxide semiconductor (CMOS) die.

15. The system according to claim 13, wherein the silicon photonically-enabled integrated circuit is in two die, a first die comprising electronic devices and a second die comprising optical devices.

16. The system according to claim 15, wherein the two die comprise CMOS die.

17. The system according to claim 12, wherein the optical modulator comprises a Mach-Zehnder Interferometer.

18. The system according to claim 12, wherein a transimpedance amplifier coupled to an output of the loopback photodetector in the self-test loopback path is a replica of a transimpedance amplifier coupled to an output of a photodetector in the main Rx path.

19. The system according to claim 12, wherein the optoelectronic transceiver is operable to extract the PRBS signal and the input electrical signal from the electrical signal utilizing a demultiplexer in the Rx path.

20. The system according to claim 12, wherein the optoelectronic transceiver is operable to receive a second optical signal in the main Rx path.

21. The system according to claim 20, wherein the optoelectronic transceiver is operable to generate a second electrical signal from the received second optical signal utilizing the photodetector in the main Rx path and multiplex the electrical with the second electrical signal.

22. A method for communication, the method comprising:
in an optoelectronic transceiver on an optoelectronics die and one or more electronics die, the transceiver having a transmit (Tx) path and a receive (Rx) path, the Rx path comprising a main Rx path and a built-in self-test loopback path:
multiplexing a first electrical signal in the Tx path with a pseudo-random bit sequence (PRBS) signal in the at least one of the one or more electronics die;
generating a first optical signal in the Tx path by applying the multiplexed electrical and PRBS signals to an optical modulator in the optoelectronics die;
receiving a second optical signal in the Rx path and converting to a second electrical signal utilizing a photodetector in the main Rx path;
communicating the first optical signal to a portion of the built-in self-test loopback path in the optoelectronics die;
converting the first optical signal to a third electrical signal in the Rx path utilizing a loopback photodetector in the built-in self-test loopback path, the loopback photodetector being a replica of a photodetector in the main Rx path;
multiplexing the second and third electrical signals in the Rx path in the at least one of the one or more electronics die; and assessing performance of the Tx and Rx paths by reducing an input power of the optical signal in the Tx path while monitoring a bit error rate.

23. A method for communication, the method comprising:
in an optoelectronic transceiver on an optoelectronics die and one or more electronics die, the transceiver having a transmit (Tx) path and a receive (Rx) path:
  multiplexing a pseudo-random bit sequence (PRBS) signal with an input electrical signal;
  generating an optical signal in the Tx path by applying the multiplexed PRBS signal and input electrical signal to an optical modulator in the optoelectronics die;
  communicating the optical signal to a portion of the Rx path in the optoelectronics die;
  converting the optical signal to an electrical signal in the Rx path utilizing a photodetector in the optoelectronics die and
  assessing performance of the Tx and Rx paths by reducing an input power of the optical signal in the Tx path while monitoring a bit error rate.

\* \* \* \* \*